United States Patent [19]

Takata

[11] Patent Number: 5,028,009

[45] Date of Patent: Jul. 2, 1991

[54] DISTRIBUTOR HEAD FOR USE WITH BOOMS HAVING SHUT-OFF CAPABILITY

[75] Inventor: Harry H. Takata, Edina, Minn.

[73] Assignee: Ag-Chem Equipment Co., Inc., Minnetonka, Minn.

[21] Appl. No.: 455,310

[22] Filed: Dec. 22, 1989

[51] Int. Cl.[5] ............................................ A01C 15/04

[52] U.S. Cl. ................................ 239/655; 239/689; 222/636; 406/192

[58] Field of Search ..................... 239/654, 655, 689; 406/131, 192; 222/630, 636, 608, 610

[56] References Cited

U.S. PATENT DOCUMENTS

| | | | |
|---|---|---|---|
| Re. 24,256 | 12/1956 | Smith . | |
| 644,607 | 3/1900 | Johnson | 406/131 X |
| 749,300 | 1/1904 | Kemp . | |
| 957,126 | 5/1910 | Tilley et al. . | |
| 1,688,706 | 10/1928 | Greene . | |
| 2,171,205 | 8/1939 | Zinke . | |
| 2,237,229 | 4/1941 | Johnson . | |
| 3,206,255 | 9/1965 | Gray . | |
| 3,260,285 | 7/1966 | Vogt . | |
| 3,586,237 | 6/1971 | Taylor | 239/655 X |
| 3,730,395 | 5/1973 | Gallogly et al. . | |
| 3,926,377 | 12/1975 | Johnson . | |
| 4,008,854 | 2/1977 | van der Lely et al. . | |
| 4,215,824 | 8/1980 | Weiste . | |
| 4,280,419 | 7/1981 | Fischer . | |
| 4,413,935 | 11/1983 | Smith et al. . | |
| 4,475,819 | 10/1984 | Balmer | 239/654 X |
| 4,480,794 | 11/1984 | Fuss et al. . | |
| 4,489,892 | 12/1984 | Tyler . | |
| 4,529,104 | 7/1985 | Tyler . | |
| 4,530,462 | 7/1985 | Andersson | 239/654 X |
| 4,547,099 | 10/1985 | Alexandrov et al. | 406/192 X |
| 4,562,968 | 1/1986 | Widmer et al. . | |
| 4,709,860 | 12/1987 | Patrick et al. . | |
| 4,767,062 | 8/1988 | Fletcher | 239/655 |
| 4,852,809 | 8/1989 | Davis et al. . | |
| 4,872,785 | 10/1989 | Schrage et al. . | |

FOREIGN PATENT DOCUMENTS

| | | | |
|---|---|---|---|
| 511611 | 4/1955 | Canada . | |
| 706091 | 4/1941 | Fed. Rep. of Germany . | |
| 1327081 | 12/1963 | France | 406/192 |
| 873930 | 10/1981 | U.S.S.R. | 239/655 |
| 807982 | 1/1959 | United Kingdom . | |

*Primary Examiner*—Andres Kashnikow
*Assistant Examiner*—William Grant
*Attorney, Agent, or Firm*—Haugen and Nikolai

[57] ABSTRACT

An improved system for pneumatic spreader systems for selective distribution of particulate material onto agricultural fields from selected ones of a plurality of elongated delivery tubes or booms. The improved feature of the present invention comprises a boom delivery closure device to block flow of particulate material from certain preselected booms through flow-blocking plates disposed at the discharge ports of said delivery tubes. The flow-blocking plates substantially completely block the flow from a preselected one or plurality of delivery tubes, and diverts said flow to a line which normally functions as a feed line when the system is in normal operation, but as a recycling line when the delivery tube output port is in blocked or shut-off disposition. The arrangement provides apparatus for converting a twin-boom arrangement to a single-boom arrangement for accommodating unusual operation such as less-than-a-full boom width when undertaking less than full width runs such as the final run of a field application.

9 Claims, 5 Drawing Sheets

DISTRIBUTOR HEAD FOR USE WITH BOOMS HAVING SHUT-OFF CAPABILITY

CROSS-REFERENCE TO RELATED APPLICATIONS

The present invention finds particular utility for use in combination with that certain "Venturi System for Agricultural Spreaders of Solid Particles" disclosed in co-pending application Ser. No. 07/315,277, filed Feb. 24, 1989, and assigned to the same assignee as the present invention, with the present invention being related to and based in part upon that certain invention disclosed and claimed in my co-pending application "Boom Flow Control Mechanism for Pneumatic Spreaders", Ser. No. 07/358,666, filed May 30, 1989, and assigned to the same assignee as the present invention.

BACKGROUND OF THE INVENTION

The present invention relates generally to an improved pneumatic spreader system for distribution of agricultural crop treating chemicals in granular, particulate or pulverulent solid form upon the soil, and more particularly to a system for achieving such distribution through the use of a plurality of elongated delivery tubes or booms with discharge orifices arranged adjacent the outer tips thereof, and wherein shut-off means are provided for individual delivery tubes or booms adjacent the discharge orifices so as to interrupt flow of particulate or granular material from certain specific selected delivery tubes, while others are permitted to remain active and in normal operation. The apparatus of the present invention is effective against granular material build-up or clogging, and is adapted to produce a more uniform distribution of solids at a constant application rate through those delivery tubes or booms remaining open and active, while providing for a relatively gentle separation of granular or particulate of solids into the ambient from the distribution head or other portion of the system.

Pressurized pneumatic systems utilizing a single distribution head delivering or metering a supply of granular or particulate material for controlled discharge of such material from a plurality of elongated booms have been employed in the past, however the systems currently in use normally deliver granular products through all of the booms at all of the time. Reliable and non-clogging means capable of providing uniform distribution and application rates have not been available for those systems providing for periodic and controlled interruption of delivery of granular products or materials from certain selected booms. The present invention provides a reliable and non-clogging system for such controlled distribution, while at the same time maintaining the distribution and application rate at a substantially uniform and constant level through the active booms without further drastic reduction in particle size of the granular or particulate material.

Agricultural techniques require the utilization of soil treating agents to either encourage, discourage, destroy, or inhibit plant growth. Such agents may generally be characterized as crop treating chemicals, and include materials designated as nutrients such as fertilizers, and pesticides such as insecticides and herbicides and also including pre-emergent and/or post-emergent plant growth inhibitors. Accordingly, the term "crop treating chemical" is used in a comprehensive sense to incorporate those various ingredients utilized in agriculture to treat either the soil, the growing crop or plants, or certain insects which may damage the crop. Active materials used for treatment are commonly found in one of three forms, either water soluble, water wettable, granular (particulate solid) or in surface-impregnated (wetted) granular solid form. In connection with the present invention, granular materials and/or surface-impregnated (wetted) granular materials are of interest, with the system of the present invention being useful in connection with the selective and uniform distribution of such materials through the system and onto the soil or other surfaces being treated.

In the treatment of agricultural fields and crops through spreading of one or more active treating ingredients, the efficiency of the treatment operation may be enhanced if the distribution of the ingredients is maintained at a uniform and/or controllable rate. Uniform application rates have become an important factor, particularly with the use of certain pesticides and/or herbicides which require a predetermined application rate in order to be effective, and yet not harmful to the crop being treated. Application rates which fall outside of the predetermined or desirable rate may tend to be ineffective, if not harmful. Additionally, the efficiency of the operation may be enhanced if the actual load required to be carried by the spreading equipment is reduced. Therefore, the utilization of dry granular or particulate solids will substantially reduce the load requirement, inasmuch as water or other treatment medium or treatment vehicle is not required. The need for multiple passes may be reduced if surface-impregnated granular material may be uniformly distributed or spread, such as through the use of a granular fertilizer having a surface impregnated with a solution containing a particular pesticide. The utilization of pressurized pneumatic system will normally eliminate o substantially reduce the vehicle load by eliminating the need for large quantities of water or other application vehicle, since pneumatic systems normally merely utilize a compressor to generate a supply of compressed air. A modest quantity of a liquid, with a liquid pressure source may be optionally employed as a means to create a solution or medium for accomplishing surface impregnation of granular material prior to delivery of the treated ingredient onto the soil.

Pneumatic spreader systems typically are mounted upon self-propelled or trailered vehicles, thereby providing a means for achieving the travel needed for distribution. In order to render these systems efficient, elongated delivery tubes forming booms are employed, and it is not uncommon for such booms to extend outwardly a distance of 18 feet or more from the center axis of the vehicle. Frequently, when the operator is close to the edge of a field, the entire width-spreading capability of the system is not needed, and in fact any double-coverage may be both wasteful and possibly even hazardous or dangerous to the crop being treated. Accordingly, and in order to achieve both a wide expanse spreading capability, as well as the capability of selectively reducing the boom width, the system of the present invention permits periodic and selective interruption of flow or delivery of particulate material from certain preselected booms. In order to render the system more highly advantageous, this interruption of flow is achieved while maintaining uniform application rates in the active portions of the boom and without increasing the tendency of the system to become clogged or causing the particle size of the solids to be significantly reduced. An added advantage of the system permits intermittent shut-down of certain booms when the fertility index varies across the field being treated. In such instances, it may become desirable to eliminate application of certain materials in certain pre-defined areas across a given field, thus providing greater versatility and economics for the apparatus of the present invention.

In order to maintain normal flow of particulate solids through a pressurized pneumatic system, uniform, consistent and uninterrupted flow patterns are desirable, and without risking discharge of solids into the ambient through the distribution head device. However, such application rate consistency becomes difficult, if not impossible to achieve, when attempts are made to periodically block-off the flow of particulate solids to selected booms. Such attempts frequently result in a non-uniformity in application rates and normally lead to a tendency of the particulate solids or granular materials to clog portions of the distribution system, and thereby establish a need for temporary shut-down of the equipment until the boom may be cleared and thus relieve the clogging. Another problem is the blow-off of pulverized granular material from the distribution head when a number of the discharge ports are closed. Such problems are of particular concern when utilizing surface-impregnated or surface-treated granular materials.

As indicated, uniformity of distribution of particulate materials depends to a certain extent upon predetermined patterns of air movement through the entire system, including the distribution head, the material transferring conduits, as well as the individual booms. Attempts to simply block-off the flow of air and/or granular material through one or more booms may interfere with normal and anticipated patterns through the system. Furthermore, attempts to modify the position of individual material transferring conduits throughout the system contributes to interference with normal patterns of flow through the system, and thus leads to lack of uniformity of distribution of particulate materials. As indicated, pressurized pneumatic systems normally employ a plurality of elongated hollow delivery tubes or booms, with these booms extending outwardly of the vehicle to certain predetermined and differing lengths. In order to preserve operational integrity and predictability, therefore, uniformity of patterns of air movement, including uniformity of flow volumes through individual tubes or booms comprising the entire system is a desirable objective and goal. Such uniformity is achieved without risking added blow-off of small solid particles from the distribution head. The features of the present invention permit selective shut-off of flow of granular material through certain preselected booms, it having been found that the system accomplishes this goal without increasing the tendency to clog, and thus preserving uniformity of continued distribution of particulate solids from the remaining operative booms in the system. A further feature of the present invention includes the addition of a rotating deflector or secondary impeller to the distributor head, with the rotating deflector functioning to control the flow of particulate solids through the system, and avoiding inadvertent discharge or blow-off of such material through air transfer openings formed in the distributor head. The features of th present invention have been found desirable in combination for improving the performance of systems utilizing elongated hollow discharge or delivery booms through controlled an selective shut-off of certain predetermined delivery tubes or booms, whenever it is desired that the system operate with certain selected delivery tubes being rendered non-functional.

SUMMARY OF THE INVENTION

Briefly, and in accordance with the present invention, an improved solid granular chemical applicator system is provided which improves the performance of pressurized pneumatic spreader systems utilizing elongated booms by providing a means for selectively interrupting delivery of material from certain booms while maintaining uniform flow of materials through the remaining booms, and at the same time, providing for substantially uniform distribution of particulate solids through the active delivery tubes and ultimately upon the surface of the soil being treated. A particularly advantageous feature of the present invention is its ability to effectively handle and utilize aqueous solution impregnated or surface treated granular materials such as pesticide/herbicide impregnated fertilizers while maintaining desired and uniform application patterns without creating unusual material build-up or clogging of individual booms. The system of the present invention is capable of functioning without risk of blowing or otherwise discharging granular or particulate material outwardly from the distribution head.

The improved distribution system of the present invention is normally and preferably mounted upon a vehicle chassis such as the chassis of a self-propelled vehicle including either a tractor or a trailer. The system includes a reservoir or hopper with a source of supply of agricultural crop treating chemicals in granular or particulate solid form to be distributed, such as, for example, a nutrient such as a fertilizer and/or a pesticide such as an insecticide or herbicide, along with a pneumatic spreader and distribution mechanism. As indicated, the granular materials may optionally have their surfaces impregnated with a coating such as a liquid concentrate of a pesticide/herbicide.

The applicator systems of the present invention are typically provided with a number of conventional components, including the following:

(a) a reservoir or hopper for retaining a supply of particulate solids;

(b) a means of conveying the granular particulate solids to a distribution head where the supply is metered by being divided into a number of aliquot portions, with this conveying means being driven with a variable speed motor so as to control the quantity of granular particulate material being delivered to the distribution head and preserving the flow rate through the discharge openings remaining operational;

(c) a means for delivering the metered aliquot portions to the elongated booms; and (d) a means, such as a blower or compressor for delivering a supply of compressed air to the booms, to move the material along with a flow of air outwardly through the booms and ultimately to a point of discharge. These systems may optionally be provided with the following:

(e) a means for impregnating the individual granular particles with an additional crop or soil-treating ingredient, such as a coating of a liquid pesticide material.

Turning to these components briefly, and individually, a distribution head controllably vented to atmosphere is provided, as indicated, for receiving a supply of particulate solids, and for metering and apportioning these solids into a plurality of generally aliquot portions. Additionally, the distribution head is provided with primary and secondary impellers for controlling the flow of particulate solids therethrough, with the secondary impeller being provided to reduce the tendency of the solids to become entrained in the air moving through the system, and being discharged through air-transfer ports formed in the head.

As will be shown in greater detail hereinafter, controlled venting of the distribution head is provided, so as to accommodate an in-flow of air when all booms are operating normally, while reducing and/or eliminating the introduction of such air when some of the individual booms are in shut-off mode, with a secondary impeller being employed to control the movement of granular material to the vent, and reducing the tendency of such materials to be inadvertently blown out of the system while in the partial shut-off mode. While conventional distribution heads are known in the art, modifications and added features of the type shown herein permit individual boom shut-off while preserving uniformity of distribution from those booms remaining active. In the present system, a plurality of elongated hollow discharge or delivery booms are employed, with the proximal end of each boom being coupled to and receiving a source of pressurized or compressed air such as at a plenum chamber, with means being provided adjacent the discharge port of each to permit shut-off of one or more preselected individual booms, as are indicated by the immediate operational requirements of the system.

OPERATION WITH ALL BOOMS FUNCTIONING NORMALLY

A discharge or delivery port is formed in each delivery port or boom at or immediately adjacent the distal end thereof, with the granular crop treating material or chemical being discharged from the system at that point. A tubular conduit or feed supply tube is coupled to the normal output of the distribution head, and is adapted to normally convey one aliquot portion of granular material from the distribution head to a junction point with a discharge or delivery boom. The junction point is located adjacent the inner or proximal end of the tube or boom at a point closely spaced from and immediately downstream of the proximal end thereof. In normal operation, the flow of air through the booms serves a dual purpose, one purpose being to carry or support the flow of granular material to the discharge point of the boom, the other being to create a partial vacuum in the tubular conduit or feed supply tube for introduction or aspiration of granular solids into the air stream. Therefore, each conduit or tubular feed member is designed to deliver one aliquot portion from the distribution head into the boom, with the compressed air normally carrying or moving the particulate solids along the boom and outwardly to the discharge port or delivery point located at the boom tip. This normal operation is modified significantly when individual booms are arranged in shut-off mode by closure of one or more discharge ports by a flow-blocking plate, as will be pointed out in detail hereinafter. Boom shut-offs of the type disclosed in my copending application, Ser. No. 07/358,666 filed May 30, 1989, now U.S. Pat. No. 4,964,575, may be used as well and referral to such types is made by incorporated reference herein. Continuing with the normal operation of the system, in order to provide for the introduction and transfer of particulate solid or granular material into the boom, particularly at the point of introduction, a zone of reduced pressure is created, such as through the Venturi means in accordance with the system disclosed in co-pending application Ser. No. 07/315,277, filed Feb. 24, 1989, and referred to hereinabove. The arrangement of the present invention has been found to function well in combination with the system disclosed in co-pending application Ser. No. 07/315,277, however the system of the present invention is compatible with and may be utilized with other systems as well.

OPERATION WITH ONE OR MORE BOOMS IN SHUT-OFF MODE

The boom selection means of the present invention includes a flow-blocking plate device which is positioned at the outer end of each of the booms selected for placing the operation of individual booms in the non-discharge or shut-off mode, with this flow interrupter device preferably being in the form of a disc or closure plate which may be controllably positioned across the discharge port of the boom. In one operational embodiment, the flow-blocking plate includes a disc or the like which is actuated by means of an electrically or hydraulically actuated cylinder, with articulating push rods, linkage means or the like being coupled between the cylinder ram and the flow-blocking means. The disc preferably blocks substantially 100 percent of the overall cross-sectional area of the discharge opening.

With the flow of air along one or more of the elongated booms being either shut-off or substantially reduced (with the exception of the residual flow), the pressurized air entering the system from the plenum is relieved or discharged through the tubular conduit or feed supply tube coupled to the output of the distribution head, and thus is guided or constrained to move through those individual booms remaining open and/or operational. In other words, during normal operation, the tubular conduit or feed supply tube functions as a means for conveying granular material from the distribution head to the boom, while during periods of boom shut-off, this conduit or tube functions as a means to recirculate air from the closed or shut-off boom back to the distribution head. In order to accommodate this flow of additional air entering the distribution head from the feed supply tubes, means are provided for controlling flow of granular or particulate solids to the vent which normally couples the distribution head to ambient, with this means providing for passage of pressurized air from the booms into and through the distribution head without carrying particulate solids outwardly from the head. Control of access to the vent by means of a secondary impeller reduces and substantially eliminates the possibility of granular material being blown outwardly of the vent during periods of partial boom shut-off. In other words, the utilization of a rotating deflector along with a vaned stator controls the flow of that portion of the pressurized air entering the distribution head through the feed supply tube to maintain the flow of granular or particulate material from the distribution head to those discharge booms which remain operative during times of partial shut-off without risking inadvertent blow-off of granular material from the vent whenever an over-pressure condition would otherwise arise in certain portions of the head.

Whenever one or more delivery tubes or booms are placed in shut-off mode, the flow of granular material from the supply hopper to the distribution head is reduced in proportion to the number of booms shut-off so as to preserve a uniform rate of application through the remaining booms. Specifically, a means is provided which interconnects the boom shut-off control and the variable speed motor driving the conveyor feeding the auger. This arrangement will be discussed in greater detail hereinafter.

As indicated hereinabove, the system of the present invention has been found to function well in combination with that certain system disclosed in application Ser. No. 07/315,277, filed Feb. 24, 1989, and referred to hereinabove, with the apparatus of the present invention being disclosed while mounted within, and functioning with such a system. As indicated, that system includes a Venturi means which comprises a flow wedge with an inlet ramp portion, an outlet ramp portion, and a throat portion intermediate the inlet and outlet ramp. In addition, a flow-blocking plate is provided at the boom discharge port to selectively close off the boom whenever desired. The Venturi portion of the system further includes a blade means which extends radially inwardly of the boom adjacent the ramp and at an angle which converges toward the distal end of the boom. The opening which is defined between the inner tip of the flow control blade and the surface of the Venturi ramp is substantially rectangular. This rectangular configuration for the open area or zone provides a means for equalizing the flow of air across the entire opening within the boom, with this feature having been found to considerably reduce any tendency of the granular material, particularly wetted granular material, to build up in the area of the Venturi and thus contribute to clogging. This reduction in tendency toward clogging has also been found to be useful in connection with the selective boom shut-off system of the present invention, and further contributes to a continuous recirculation of air from the individual booms back to and through the distribution head for ultimate passage either through booms functioning normally or outwardly to atmosphere.

In order to maintain desired, predetermined and uniform application rates, means are preferably provided to reduce the flow of incoming material to the distribution head in an amount proportional to the reduction in output quantity. In other words, since the overall output volume of the system is at least temporarily reduced, and the rate of delivery of incoming material to the distribution head is correspondingly reduced so as to compensate for the reduced output of the system. Such an operational feature is conveniently accomplished by means of correlating the shut-off of one or more booms with a proportional reduction in drive rate of the conveyor transferring material from the hopper to the feed auger.

It has been found that the shut-off means of the present invention provides for even and positive flow for granular and/or particulate material present in the system, including the flow or movement of these solids through those certain booms which remain operative. By maintaining the rate of input of granular material to the system proportional to the system output, uniform application rates are achieved. Furthermore, this uniform flow of granular or particulate material is maintained without creating additional tendencies toward unusual distribution patterns within the system, either through additional pulverizing of solids, inadvertent release or blow-off of material from the distribution head, or clogging of granular materials within the elongated boom structures.

Therefore, it is a primary object of the present invention to provide an improved system for delivery of granular material or particulate solids from a pressurized pneumatic system, wherein an improved boom shut-off means is provided at the discharge point of the boom in order to achieve temporary interruption of delivery of particulate solids from preselected booms, while maintaining uniform delivery of granular or particulate solids into the flow of pressurized air moving through each of the elongated delivery booms remaining active.

It is a further object of the present invention to provide an improved selective delivery system for use in combination with pressurized pneumatic systems for distribution of granular or particulate solids therefrom, including surface-wetted granular solids, and wherein the system includes means mounted at the discharge port of each elongated delivery boom and designed to controllably interrupt the flow of air and accordingly check delivery of particulate solids from the preselected booms.

It is yet further object of the present invention to provide an improved pressurized pneumatic system for the distribution of particulate solids upon an agricultural field, and wherein the system is provided with an improved means for interrupting the flow of granular or particulate solids from certain preselected delivery tubes, while maintaining an even and uniform flow of granular solids through the tubes remaining active, and wherein means are further provided to avoid inadvertent blow-off of granular solids from the distribution head while certain delivery booms of the system are operating in shut-off mode.

Other and further objects of the present invention will become apparent to those skilled in the art upon a study of the following specification, appended claims, and accompanying drawings.

DESCRIPTION OF THE PREFERRED EMBODIMENT

Figure 1:
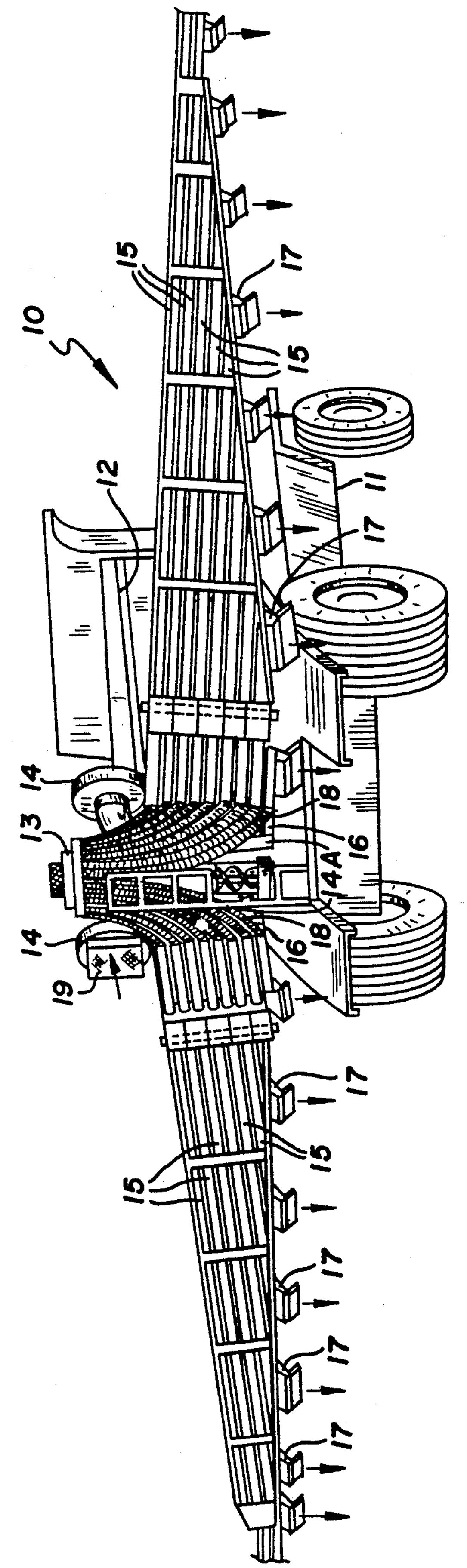
FIG. 1 is a perspective view of the side and rear portions of a typical vehicle chassis supporting a hopper and a vehicular-mounted distribution system incorporating a distribution head, an auger feeding material from the hopper to the distribution head, with the auger casing being partially broken away, a pair of blowers, and a plurality of elongated hollow delivery tubes or booms, and wherein the booms are provided with the improved shut-off control means of the present invention.

In accordance with the preferred modification of the present invention, and with particular attention being directed to FIG. 1 of the drawings, the pressurized pneumatic distribution system generally designated 10 is mounted upon vehicle chassis 11, and includes a reservoir 12 for retaining a source of supply of granular or particulate solids to be distributed through the system. A distribution head 13 is provided for apportioning or dividing the particulate solids received or delivered from reservoir or hopper 12 into a plurality of generally aliquot portions, with this distribution head having a vent to atmosphere in the upper plate thereof (more fully described hereinafter), for controlling the amount of air transferred into or out of the system. The vent to atmosphere is utilized to permit transfer of air in response to the opening or closure of one or more of the booms, and is provided with means in the form of a secondary impeller for controlling the flow of particulate or solid air-entrained material prior to its passage through the vent and thus into communication with atmosphere in order to reduce or eliminate flow of air-entrained solids into the atmosphere during periods of partial boom shut-off.

A plurality of elongated hollow delivery booms 15—15 are provided to receive, transfer or move laterally outwardly, and ultimately spread the solids on the ground, with the booms being of predetermined and differing lengths, and extending laterally outwardly of the vehicle from proximal ends 16—16 to distal discharge ends 17—17. A source of compressed air such as fan blowers 14—14 for the pressurized pneumatic system is utilized to create a flow of pressurized air into a plenum or manifold 14A and from each plenum into the proximal ends 16—16 of each boom, and ultimately through each of the hollow elongated booms 15—15 to outlet or discharge as at 17—17. Such blowers or other sources of compressed air, and their arrangement in this type of system are, of course, well known to those in the art, and need not be described in detail here. As is apparent in FIG. 1, a cooler device 19 may be employed in combination with each of the blowers in order to cool hydraulic fluid being used to drive components within the system. Such a device is illustrated in FIG. 1. A plurality of tubular feed members 18—18 are also provided, with each of such tubular feed members extending between and coupling a selected output of the distribution head 13 to a selected one of said delivery booms 15—15. Also, as is conventional, the tubular feed members 18—18 provide for delivery of each of the aliquot portions into the elongated boom 15 at a point adjacent the proximal end 16, and for ultimate delivery to the distal discharge port at the end 17 of the boom. Also, as indicated, such spreader structures are known in the art and need not be discussed and described in detail here. One such spreader structure is illustrated in U.S. Pat. No. 3,568,937 to Grataloup, with another such system being disclosed in U.S. Pat. No. 2,206,876 to Chater.

As will become apparent hereinafter, each of the tubular feed members 18—18 is coupled to a selected one of the hollow delivery booms 15—15 at a juncture point adjacent the proximal end of one of the booms, and thus achieves its purpose of continuously and uniformly introducing one aliquot portion of the particulate solids to the flow of pressurized air moving through each of the delivery booms, while functioning as a return conduit for the flow of compressed air during that time when the shut-off means or flow-blocking plate has been activated. During normal operation, and while the boom is delivering particulate solids through its delivery port introduction of those particulate solids into the delivery booms is undertaken on a basis such that the actual introduction of the solids into the flow of pressurized air is enhanced, thereby reducing if not totally eliminating tendencies of the solid particles to build up in selected locations, and thereby leading to clogging of the boom. When the boom is in shut-off mode, the tubular members 18—18 function to carry or recirculate the excess flow of air from the plenum back to the distribution head. This added flow of air is thereafter passed through the distribution head to flow through either those tubular feed members 18—18 which remain open and active and which are carrying flow of particulate solids outwardly through their associated delivery booms, or outwardly through the vent opening as more fully described hereinafter.

Figure 2:
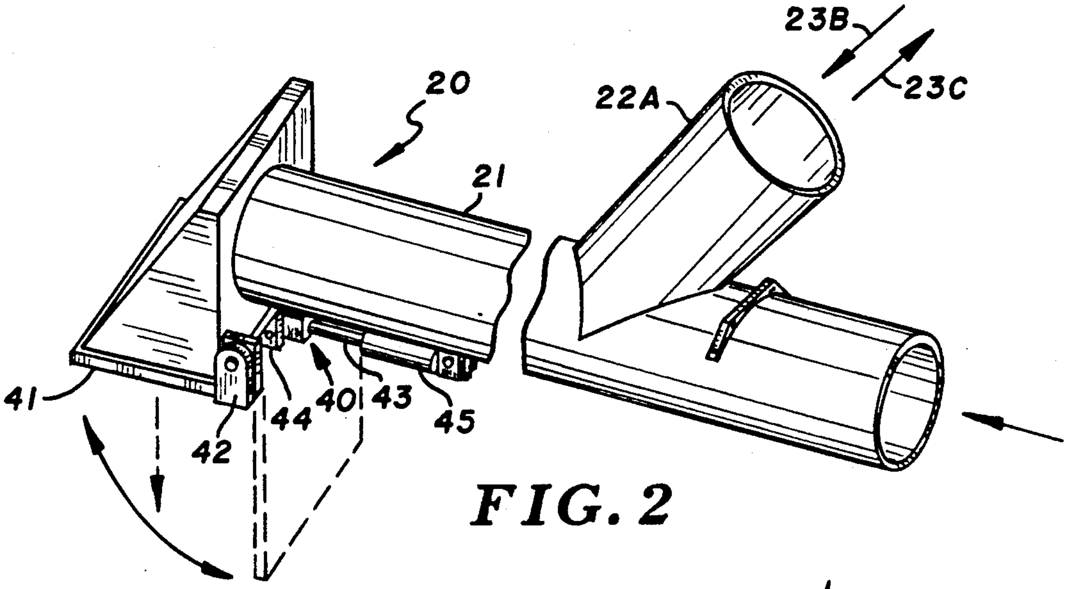
FIG. 2 is a detail perspective view of the external end portions of the hollow delivery tubes or booms of the present invention, with the center portion of the boom being broken away and illustrating the point at which the solid supply tube joins the delivery boom, and also the discharge point of the boom at which point the improved shut-off means of the present invention is positioned.
Figure 3:
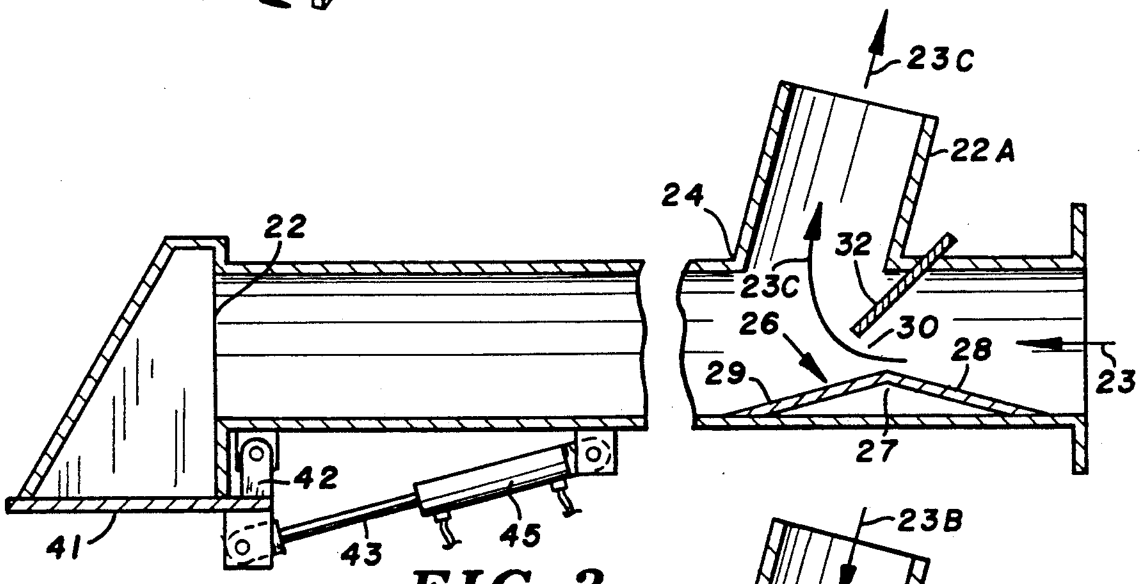
FIG. 3 is a view taken through the diameter of that portion of the device illustrated in FIG. 2 and illustrating the flow-blocking plate means while in its closed disposition for boom shut-off.
Figure 4:
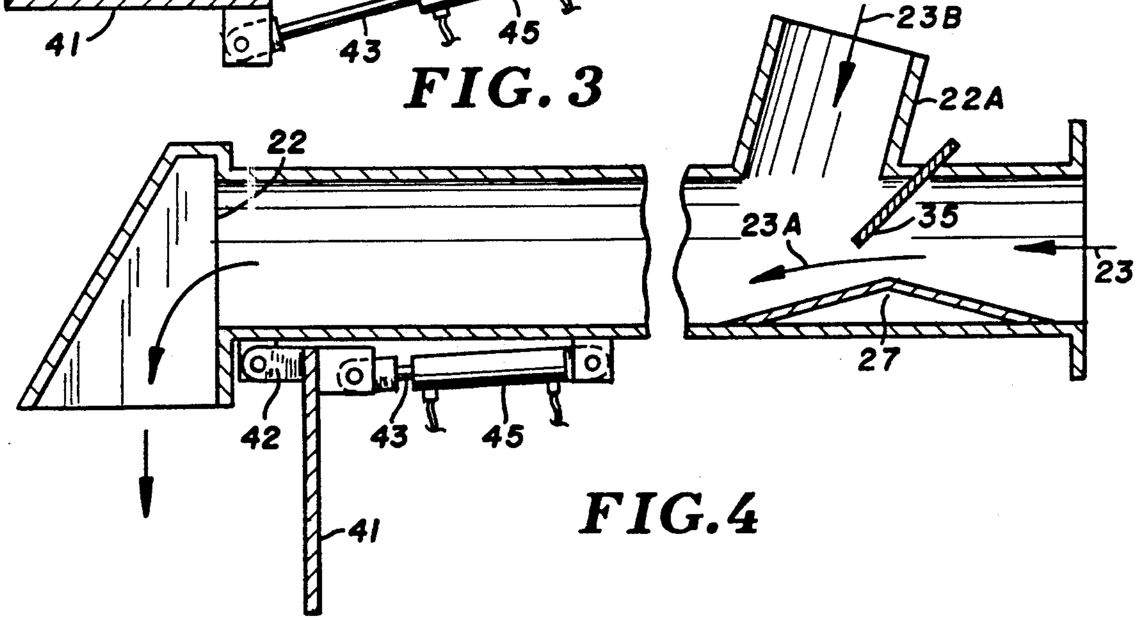
FIG. 4 is a view similar to FIG. 3, but illustrating the flow-blocking plate in its open disposition.

Attention is now directed to FIGS. 2-4 of the drawings wherein details of the one embodiment of the boom shut-off arrangement provided within each of the hollow delivery booms is disclosed. Specifically, and with attention being directed to FIGS. 2-4 of the drawings, the boom shut-off containing portion generally designated 20 of the system 10, comprises a relatively short outer distal segment 21 of one of the delivery booms 15—15, with the end 22 being an end adjacent to or constituting the distal end of tube 21. A segment 22A of a tubular feed member 18 is also shown, with this segment having been previously referred to as a portion of one of the plurality of tubular feed members 18—18 which are in communication with the distribution head 13. Tube segment 22A is coupled with boom segment 21 at juncture point 24.

Venturi means are provided within the system as shown generally at 26. Venturi 26 includes a body portion 27 with an inlet ramp 28, and outlet ramp 29, and a generally rectangular throat portion 30 therebetween. Throat portion 30 extends radially inwardly from the inner surface of the boom and defines generally a chordal line across the hollow delivery boom, such as is seen in the views of FIGS. 3 and 4. The Venturi means 26 further functions in cooperation with blade means 32, with blade means 32 being mounted in generally opposed relationship to the throat portion of the Venturi means 26. The zone between the radially inwardly disposed tip of blade 32 and the throat portion 30 defines a gap therebetween, and thus controlling the cross-sectional area available for the flow of air through the throat zone 30 of the Venturi 26. The tip of the blade 32 extends generally along a chordal line of delivery boom segment 21, with the tip being shown at 35 (FIG. 4). Blade 32 is mounted at an angle which converges toward the distal end of the boom. Furthermore, the inner tip of blade 32, as at 35, intersects at least a portion of a projection of an inwardly directed projection of tubular feed member 22A into delivery boom segment 21. This disposition of blade 32 assists in controlling the constant width opening across the flow of air through the system and in creating the vacuum in tube 22A during periods of normal operation.

As indicated in the drawings, blade 32 is normally set in place, but can be made to be adjustably positioned in order to create the maximum vacuum in the tube 22A during times of normal operation. When the system is functioning with an individual boom in shut-off condition, then and in that event, the related tubular feed members 18—18 function as a flow conduit for recirculation of compressed air through tubular feed member 18 and into the distribution head for ultimate discharge through one or more of the booms which remain operational in the normal mode. Blade 32 further aids in effecting positive flow directions for the solids at all times, and the configuration of the opening eliminates or substantially reduces any build up or clogging of particulate solids within the delivery tubes, regardless of the immediate mode of operation.

With continued attention being directed to FIGS. 2, 3 and 4 of the drawings, it will be observed that arrow 23 represents the direction of flow of air through the proximal end of the boom, with arrow 23A illustrating the normal and continuing flow of air during periods of normal operation. Air from the distribution head, along with the aliquot portion of solids flows through each of the tubes 18—18 in the direction of arrow 23B. During times of boom shut-off with damper 41 closed, air passing from the plenum and into the boom along the direction of arrow 23 is diverted, and flows back to the distribution head along one of the tubular feed members 18—18 and in the direction of the arrow 23C. Any particulate material which may have been confined within the boom at a point in time when shut-off was initiated will accordingly be entrained or suspended within the flow of air in the direction of arrow 23C and be returned to the distribution head without contributing to an accumulation or clogging of material within the relevant boom member.

Specifically, the coupling between the proximal ends 16—16 of the booms and the face of the plenum are arranged in staggered positions at the juncture points with the plenum body.

Turning now to the shut-off feature of the present invention, and with particular attention being directed to FIGS. 2-4 inclusive of the drawings, boom shut-off system generally designated 40 comprises a flow-control or flow-blocking plate or disc 41 disposed at the discharge opening of each boom for which shut-off may be desired with the position of flow control plate 41 being controlled by actuating or articulating linkage 42. Linkage 42 includes, as indicated, actuating rod 43 together with pivotal linkage means 44. The position of the individual dampers 41 is determined by associated hydraulic cylinder 45 and its actuating rod or ram 43. Alternatively, solenoids may be utilized to actuate the damper linkage members. The immediate position of ram 43, such as either extended position or retracted position, will, of course, determine the open or closed position of the associated blocking plate 41.

As indicated hereinabove, the discharge port of the boom is closed or blocked by flow control plate 41. It has been found that the interior volumes of the boom structure will have minimal accumulation of the granular or particulate material when the blocking plate is closed and the fluid recycling capability of tubes 22A is utilized. In normal operating mode, therefore, there is nothing to impede the flow of particulate material through the elongated boom. The system of the present invention is particularly adapted for use with spreader systems wherein it is desired that one or more of the delivery booms be deactivated or shut-off during times when the remaining booms are in normal operation. Such periods of deactivation would typically occur when the spreader is making its final pass across a field, and while the end portion of a field is being treated with the area remaining to be treated having a width less than the full width of the spreader. Because excessive or double-application of materials can be extremely detrimental, particularly when utilizing a combination of fertilizers and/or herbicides, it becomes necessary to provide a means for avoiding such double-application, while maintaining the application at its preselected rate. Thus, the system of the present invention is useful with those systems having a plurality of hollow delivery booms of differing lengths and wherein it becomes desirable to deactivate or shut-off preselected booms so as to preserve uniform rates of application. In certain instances and for purposes of uniformity, it has been found desirable to increase the diameter of the longer booms utilized in multiple boom systems in order to reduce the amount of back pressure created in these longer booms. Also, the outward portions of the longer booms may be coupled with an expanded zone so as to have at least a portion of the delivery boom provided with a somewhat increased diameter relative to the shorter booms. Such a design also provides a means of reducing back pressure within longer booms, along with maximum vacuum being maintained in tube 22A coupled to the distributor head.

As indicated hereinabove, whenever the system is operating in a partial shut-off mode, the quantity of granular or particulate material being introduced into the system must be reduced in order to compensate for the reduction in overall delivery. With attention being directed to FIGS. 5 and 6 of the drawings, it will be noted that the auger shown generally at 50 includes an outer sleeve 51, together with an internally arranged screw 52. Screw 52 is driven by constant speed motor 53 shown schematically with the conveyor bringing material from hopper 12 to the auger screw 52 being driven by variable speed motor 53A, the speed of which is controlled by motor speed control 54 (see FIGS. 5 and 6). Thus, whenever one or more booms are shut off, steps are taken to proportionally reduce the speed of horizontal conveyor system including motor 53A supplying auger screw 52 in order to maintain a constant material introduction and application rate. A speed proportioning means is adequate to provide for control of the conveyor speed of horizontal conveyor drive motor 53A. Variable speed motors are utilized in connection with conveyor motor 53A, with a conventional speed control being also appropriate for utilization in speed control 54. Such drive motors and speed controls are, of course, commercially available.

Figure 5:
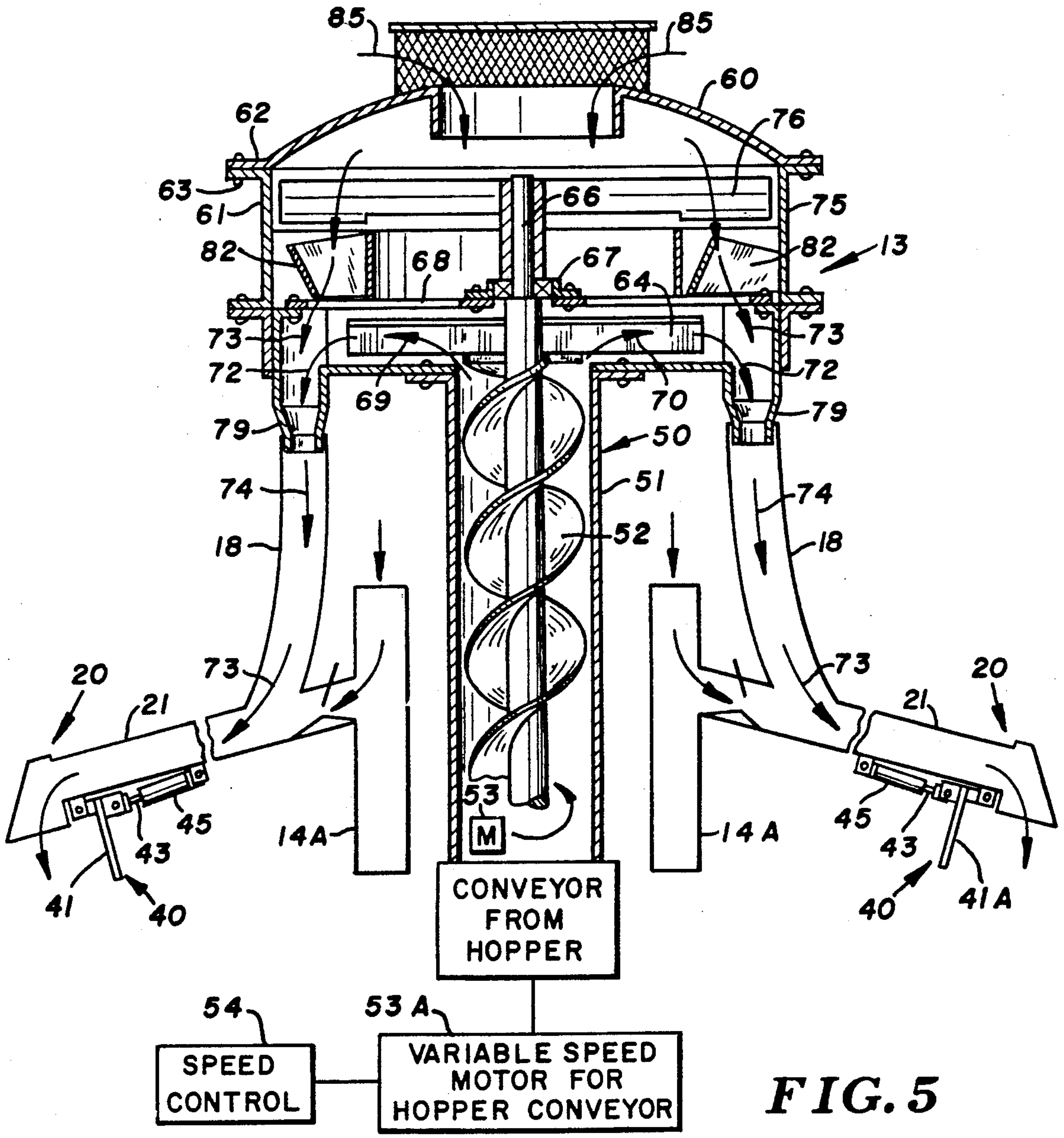
FIG. 5 is a vertical sectional view of a typical distribution head, in combination with a plurality of delivery tubes or booms, and with all of the booms being in open or normal operational mode, and with the improved rotating deflector, baffle system and vent at the head being shown.
Figure 6:
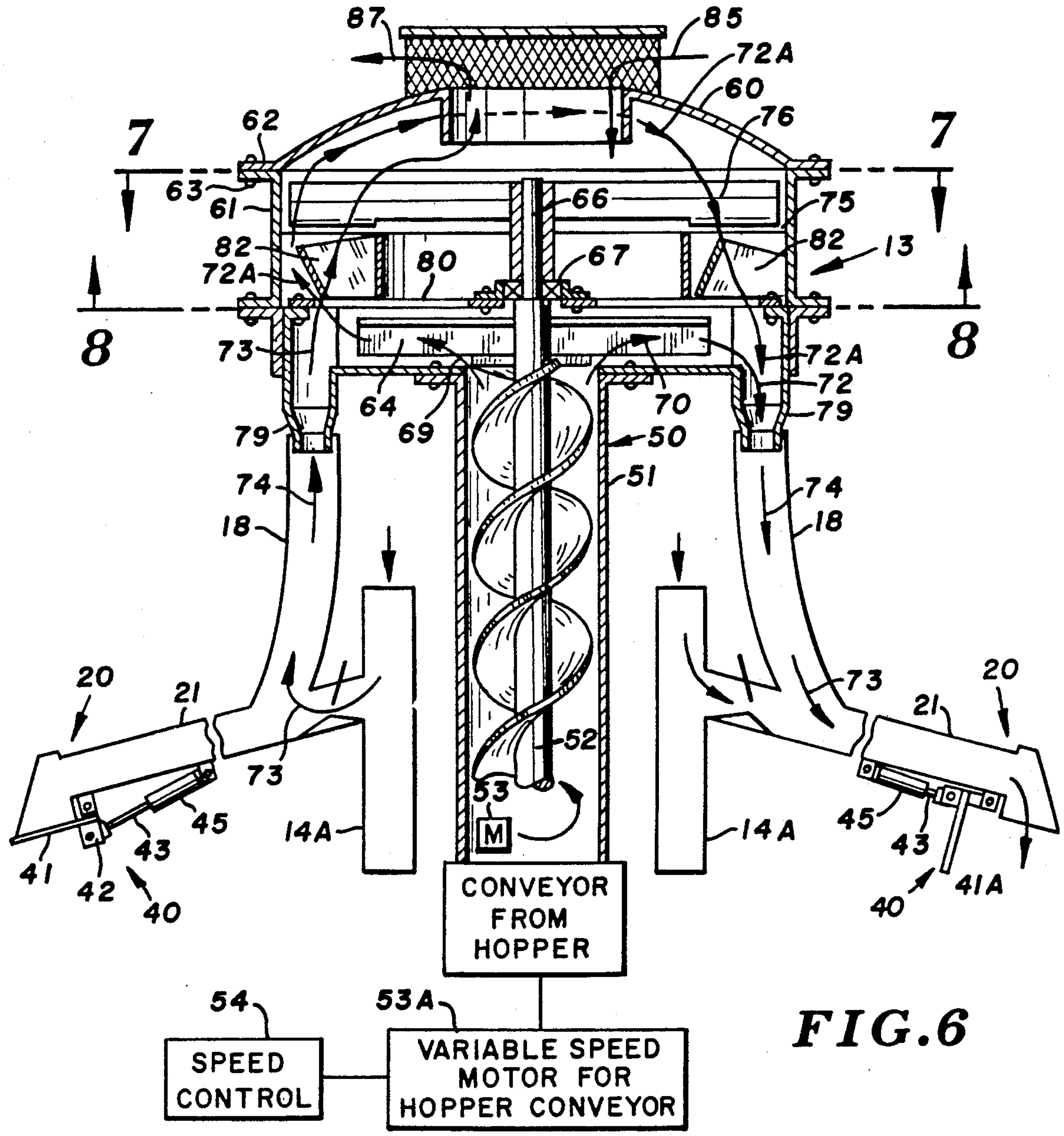
FIG. 6 is a view similar to FIG. 5, but illustrating the system with the left side of the illustrated booms being in shut-off mode, and with the air vent at the head delivering a volume of air therefrom.
Figure 7:
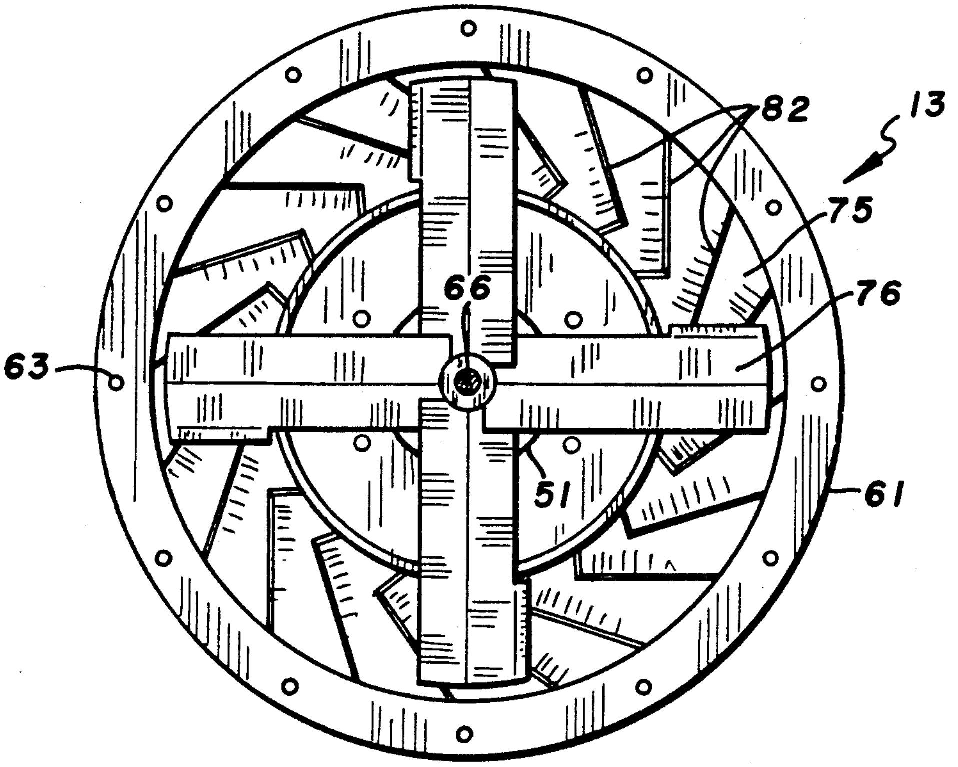
FIG. 7 is a horizontal sectional view of that portion of the distribution head illustrated in FIG. 6, and being taken along the line and in the direction of the arrows 7—7 of FIG. 6.
Figure 8:
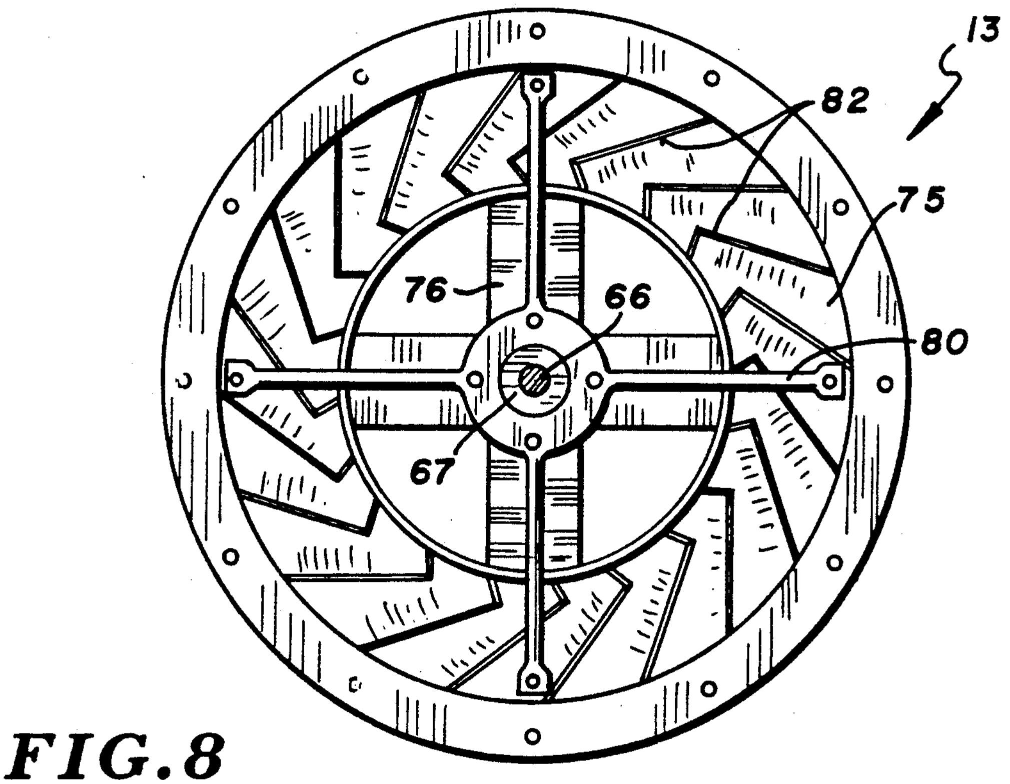
FIG. 8 is a horizontal sectional view of that portion of the distribution head illustrated in FIG. 6, and taken along the line and in the direction of the arrows 8—8 of FIG. 6.

Continued attention is directed to FIGS. 5 and 6 of the drawings wherein the interior of the distribution head is illustrated. Specifically, and in FIG. 5, distribution head 13 includes a cover member 60 overlying flanged cylindrical member 61, with cover 60 joining member 61 at and along mating surfaces 62 and 63 respectively. An internally arranged spinner 64 is provided which rotates with auger screw 52 disposed within auger housing or sleeve 51. Shaft 66 extends upwardly from auger screw 52, and is maintained within a bearing housing such as at 67. In the arrangement illustrated, bearing housing 67 is shown mounted upon the top surface of spider member 68, although in certain applications, it may be desirable for bearing 67 to be disposed on the underside of plate 68. Spinner 64 is preferably provided with arcuately formed arms, which are mounted at their inner ends on shaft 66. Spinner 64 moves solid material, such as granular or particulate solid material, outwardly along the path of arrows 69 and 70. As indicated, the granular material, such as fertilizer or the like, moves along a path from the lifting auger 51-52, outwardly through spinner elements 64, and thence into tubular feed members 18—18. As is indicated in FIG. 5, both flow control plates 41 and 41A are in open or normal position, thus permitting flow to occur through the associated booms.

Attention is now directed to FIG. 6 of the drawings wherein flow control plate 41 is closed. In this arrangement, the flow of air and granular material is modified from the arrangement of FIG. 5. Specifically, the granular material continues to move along path 69 (FIG. 5), but assumes a modified path of travel as along the path of arrows 72A—72A. Air from the manifold moves along path of arrows 73—73, and upwardly through tubular feed member 18 along the path of arrows 74—74. This added flow of air requires attention be given to venting of the air inlet or other communication with atmosphere.

With continued attention being directed to both FIGS. 5 and 6, it will be noted that the upper cylindrical portion 75 of distributor 13 is superimposed onto the main distribution portion thereof. Cylindrical portion 75 houses rotating deflector 76 therewithin, with deflector 76 being fast on shaft 66. The lower end of cylindrical chamber 75 is positioned immediately over the main distribution head with the interior portions of the cylindrical member 75 extending upwardly from the lower or distributor portion of distributor head 13. The rotating deflector 76 is designed to rotate and provide a rotatory force or rotating stream for particulate material within the chamber defined by cylindrical member 75. Accordingly, particulate material will be moved circumferentially and outwardly by deflector blades 82—82, thereby reducing the overall velocity of the solids and causing them to drop downwardly and thus become distributed more evenly by virtue of the directional flow vector created by the combined motion of rotating deflector 76 and blades 82—82.

With attention being directed to FIG. 5 of the drawings, arrow 85 indicates an inwardly directed flow of air, while in FIG. 6, with a number of the booms being in closed disposition, an outward flow of air from the system is indicated by the arrows 87—87. It has been found that air motion within the confines of the distributor head contributes to the even flow of granular material into and through the active or open booms. It will be further appreciated that the details of the design illustrated here are for purposes of illustration only, and are not to be construed as a limitation upon the scope of the present invention.

What is claimed is:

1. In combination with a pressurized pneumatic system for substantially uniform distribution of particulate solids upon the soil from a system mounted upon a self-propelled vehicle and including a reservoir with a source of supply of particulate solids to be distributed, a distribution head for metering and apportioning particulate solids from said source into a plurality of generally aliquot portions, a plurality of elongated hollow delivery tubes of predetermined and differing lengths extending laterally outwardly of said vehicle from a proximal end to a delivery port disposed at the distal discharge end of each delivery tube, a source of compressed air for creating a flow of pressurized air through said hollow elongated delivery tubes, a plurality of tubular feed members, each extending between said distribution head and a selected one of said delivery tubes, for creating a fluid communication link between each of said tubes and said distribution head to accommodate delivery of each of said aliquot portions from the proximal end to the distal discharge end of a boom when operative, a juncture point adjacent the proximal end of each of said hollow elongated delivery tubes for introducing one aliquot portion of particulate solids to the flow of pressurized air moving through each of said delivery tubes when operative, and means adjacent said juncture point for creating a partial vacuum along said delivery tube at said juncture point during times of passage of particulate solids therethrough; the improvement comprising:

(a) shut-off means operatively coupled to the delivery port of at least preselected ones of said elongated delivery tubes and comprising:
   (1) articulated flow-blocking plate means operatively positioned adjacent the delivery port of said preselected delivery tubes and being disposed immediately adjacent to said delivery port and with articulating means including a drive means arranged to reciprocally move said flow-blocking plate means to controllably open and close said delivery port;
(b) conveyor means for supplying particulate solids to said distribution head from said reservoir;
(c) drive means for said conveyor means; and
(d) means responsive to the closure of at least one of said delivery ports by said flow-blocking plate means to vary the speed of said conveyor means to reduce the rate of flow of particulate solids from said reservoir to said distribution head.

2. The system as defined in claim 1 being particularly characterized in that said flow-blocking plate drive means is a hydraulic cylinder.

3. The system as defined in claim 1 being particularly characterized in that said distribution head is vented to atmosphere in the zone where said aliquot portions are being created.

4. The system as defined in claim 1 being particularly characterized in that said conveyor means comprises an auger for delivery of particulate solids from said reservoir to said distributor head at a point where aliquot portions are formed therefrom.

5. In combination with a pressurized pneumatic system for substantially uniform distribution of particulate solids upon the soil from a system mounted upon a self-propelled vehicle and including a reservoir with a source of supply of particulate solids to be distributed, a distribution head for metering and apportioning particulate solids from said source into a plurality of generally aliquot portions, a plurality of elongated hollow delivery tubes of predetermined and differing lengths extending laterally outwardly of said vehicle from a proximal end to a delivery port disposed at the distal discharge end of each delivery tube, a source of compressed air for creating a flow of pressurized air through said hollow elongated delivery tubes, a plurality of tubular feed members, each extending between said distribution head and a selected one of said delivery tubes, for creating a fluid communication link between each of said tubes and said distribution head to accommodate delivery of each of said aliquot portions from the proximal end to the distal discharge end of a boom when operative, a juncture point adjacent the proximal end of each of said hollow elongated delivery tubes for introducing one aliquot portion of particulate solids to the flow of pressurized air moving through each of said delivery tubes when operative, and means adjacent said juncture point for creating a partial vacuum along said delivery tube at said juncture point during times of passage of particulate solids therethrough; the improvement comprising:

(a) shut-off means operatively coupled to the delivery port of at least preselected ones of said elongated delivery tubes and comprising:
  (1) articulated flow-blocking plate means operatively positioned adjacent the delivery port of said preselected delivery tubes and being disposed immediately adjacent to said delivery port and with articulating means including a drive means arranged to reciprocally move and flow-blocking plate means to controllably open and close said delivery port;
(b) conveyor means for supplying particulate solids to said distribution head from said reservoir;
(c) drive means for said conveyor means;
(d) means responsive to the closure of at least one of said delivery ports by said flow-blocking plate means to vary the speed of said conveyor means to reduce the rate of flow of particulate solids from said reservoir to said distribution head;
(e) said conveyor means comprises an auger for delivery of particulate solids from said reservoir to said distributor head at a point where aliquot portions are formed therefrom; and
(f) said conveyor means bringing material to said auger has variable speed drive means and motor control means are provided for said conveyor means to vary the speed of said conveyor motor control means in response to closing of said preselected boom by said shut-off means.

6. In combination with a pressurized pneumatic system for substantially uniform distribution of particulate solids upon the soil from a system mounted upon a self-propelled vehicle and including a reservoir with a source of supply of particulate solids to be distributed, a distribution head for metering and apportioning particulate solids from said source into a plurality of generally aliquot portions, a plurality of elongated hollow delivery tubes of predetermined and differing lengths extending laterally outwardly of said vehicle from a proximal end to a delivery port disposed at the distal discharge end of each delivery tube, a source of compressed air for creating a flow of pressurized air through said hollow elongated delivery tubes, a plurality of tubular feed members, each extending between said distribution head and a selected one of said delivery tubes, for creating a fluid communication link between each of said tubes and said distribution head to accommodate delivery of each of said aliquot portions from the proximal end to the distal discharge end of a boom when operative, a juncture point adjacent the proximal end of each of said hollow elongated delivery tubes for introducing one aliquot portion of particulate solids to the flow of pressurized air moving through each of said delivery tubes when operative, and means adjacent said juncture point for creating a partial vacuum along said delivery tube at said juncture point during times of passage of particulate solids therethrough; the improvement comprising:

(a) shut-off means operatively coupled to the delivery port of at least preselected ones of said elongated delivery tubes and comprising:
  (1) articulated flow-blocking plate means operatively positioned adjacent the delivery port of said preselected delivery tubes and being disposed immediately adjacent to said delivery port and with articulating means including a drive means arranged to reciprocally move said flow-blocking plate means to controllably open and close said delivery port;
(b) conveyor means for supplying particulate solids to said distribution head from said reservoir;
(c) drive means for said conveyor means;
(d) means responsive to the closure of at least one of said delivery ports by said flow-blocking plate means to vary the speed of said conveyor means to reduce the rate of flow of particulate solids from said reservoir to said distribution head; and
(e) said distribution head including a primary chamber, a primary impeller for moving particulate solids toward said elongated tubular feed members, and wherein a secondary chamber is disposed immediately above said primary impeller in superimposed relationship therewith, and wherein a rotating deflector is disposed within said secondary chamber for ration with said primary impeller, and for carrying particulate solids centrifugally outwardly to the walls of said secondary chamber.

7. The system as defined in claim 6 being particularly characterized in that said distribution head is vented to atmosphere through said second chamber.

8. The system as defined in claim 6 being particularly characterized in that said distribution head is equipped with an auger for delivery of particulate solids from said reservoir to the primary chamber of said distribution head.

9. In combination with a pressurized pneumatic system for substantially uniform distribution of particulate solids upon the soil from a system mounted upon a self-propelled vehicle and including a reservoir with a source of supply of particulate solids to be distributed, a generally cylindrical distribution head for metering and apportioning particulate solids from said source into a plurality of generally aliquot portions, a generally vertically disposed auger for transferring particulate solids from said reservoir to an output zone within said distribution head, a plurality of elongated hollow delivery tubes of predetermined and differing lengths extending laterally outwardly of said vehicle from a proximal end to a delivery port disposed at the distal discharge end of each delivery tube, a source of compressed air for creating a flow of pressurized air through said hollow elongated delivery tubes, a plurality of tubular feed members, each extending between said distribution head and a selected one of said delivery tubes, for creating a fluid communication link between each of said tubes and said distribution head to accommodate delivery of each of said aliquot portions from the proximal end to the distal discharge end of a boom when operative, a juncture point adjacent the proximal end of each of said hollow elongated delivery tubes for introducing one aliquot portion of particulate solids to the flow of pressurized air moving through each of said delivery tubes when operative, and means adjacent said juncture point for creating a partial vacuum along said delivery tube during times of passage of particulate solids therethrough; the improvement comprising:

(a) shut-off means operatively coupled to at least one preselected elongated delivery tube and comprising:

(1) articulated flow-blocking means operatively positioned within said at least one delivery tube, and including means for moving said flow blocking means to controllably open and close said delivery tube downstream of said juncture point;

(2) vent means for providing communication between said distribution head and atmosphere;

(3) rotating deflector means mounted for rotation about a central axis and being disposed within said distribution head between said output zone and said vent means for rotatably urging particulate solids circumferentially outwardly of said output zone; and (4) deflector blades within said distribution head and positioned outwardly of said rotating deflector means and being angularly disposed relative to said central axis for directing particulate solids circumferentially downwardly toward said output zone and away from said vent means.

* * * * *

UNITED STATES PATENT AND TRADEMARK OFFICE
CERTIFICATE OF CORRECTION

PATENT NO. : 5,028,009

DATED : July 2, 1991

INVENTOR(S) : Harry H. Takata

It is certified that error appears in the above-identified patent and that said Letters Patent is hereby corrected as shown below:

Column 14, line 38, "reciprocally" should read -- reciprocably --.

Column 15, line 30, "reciprocally move and" should read -- reciprocably move said --.

Column 16, line 20, "reciprocally" should read -- reciprocably --. Line 38, "ration" should read -- rotation --. Line 43, "second" should read -- secondary --.

Signed and Sealed this

Fifteenth Day of December, 1992

*Attest:*

DOUGLAS B. COMER

*Attesting Officer*

*Acting Commissioner of Patents and Trademarks*